United States Patent [19]

Bertoncini et al.

[11] Patent Number: 5,895,688
[45] Date of Patent: Apr. 20, 1999

[54] PROCESS FOR SPRAYING CONCRETE OR MORTAR

[75] Inventors: André Bertoncini, Epalinges, Switzerland; Jérôme Dugat, Montigny-Le-Bretonneux; Laurent Frouin, L'Hay Les Roses, both of France; Jean-Luc Jaquier, Prez-Vers-Siviriez, Switzerland; Evelyne Prat, Pantin, France

[73] Assignees: Rhone-Poulenc Chimie, Courbevoie Cedex; Bouygues, Saint Quentin En Yvelines Cedex, both of France

[21] Appl. No.: 08/626,346

[22] Filed: Apr. 2, 1996

[30] Foreign Application Priority Data

Apr. 3, 1995 [FR] France .................. 95 03902

[51] Int. Cl.$^6$ .................................................. B05D 1/02
[52] U.S. Cl. ............................................ 427/421; 427/427
[58] Field of Search .................................. 427/421, 427

[56] References Cited

U.S. PATENT DOCUMENTS 3,114,647  12/1963  Mecham ........................ 106/89

FOREIGN PATENT DOCUMENTS

| | | |
|---|---|---|
| 0307066 | 3/1989 | European Pat. Off. . |
| 0329509 | 8/1989 | European Pat. Off. . |
| 0407262 | 1/1991 | European Pat. Off. . |
| 0506421 | 9/1992 | European Pat. Off. . |
| 0519155 | 12/1992 | European Pat. Off. . |
| 0520862 | 12/1992 | European Pat. Off. . |
| 2241499 | 9/1991 | United Kingdom . |

*Primary Examiner*—Shrive Beck
*Assistant Examiner*—Bret Chen
*Attorney, Agent, or Firm*—Burns, Doane, Swecker & Mathis, L.L.P.

[57] ABSTRACT

A process for spraying concrete or mortar, by a dry route or by a wet route, in order to produce on a surface a layer of concrete or of mortar. Just before or at the time of spraying, an aqueous suspension (A) of silica and of an aluminum compound chosen from aluminum sulphate, basic aluminum sulphates, alums and mixtures thereof is added to the concrete or mortar. The aqueous suspension (A) has a pH lower than 4, a solids content of between 10 and 50% by weight, and, after a period at rest of 48 hours, is in the form of a gel which is reversible under low shear. The aqueous suspension (A) is effective for increasing the thickness of the sprayed layer and reducing rebound of the concrete or mortar sprayed onto the surface.

46 Claims, No Drawings

PROCESS FOR SPRAYING CONCRETE OR MORTAR

The present invention relates to a process for spraying concrete or mortar, using a particular aqueous suspension of silica, especially of precipitated silica and of an aluminium compound, in particular of aluminium sulphate.

It also relates to the use of this aqueous suspension as an additive for concrete or mortar to be sprayed.

The use of processes for spraying concrete or mortar in order to apply a layer of sprayed concrete or mortar to a support or surface to be concreted is well known.

Two types of processes for spraying concrete or mortar thus exist today, in this case processes for spraying by a dry route and processes for spraying by a wet route.

In the processes for spraying concrete by a dry route a dry mix is prepared first of all including all the conventional anhydrous components of a concrete or of a mortar, that is to say a mixture including cement, granulates (sand in the case of a mortar, coarser granulates such as gravel and/or pebbles, and generally sand, in the case of a concrete) and optionally additives in solid form; this dry mix (in general containing a maximum of 2 to 4% of moisture) is then conveyed, generally with the aid of compressed air, pneumatically, in a pipe, towards a spraying nozzle; wetting with water (called slaking water) is then performed at the spraying nozzle, the mixture of water+solids (the latter constitute the initial anhydrous mix) needing to be homogeneous; a setting accelerator, as a powder or in liquid form, is generally added upstream or at the spraying nozzle; the mixture obtained is sprayed from the spraying nozzle with the aid of compressed air (spraying air or propelling air) on to the surface to be concreted.

The major disadvantage of this type of process for spraying concrete or mortar is the high loss due to rebound of the concrete or of the mortar on the support (or the surface) to be concreted during the spraying stage; high rebound of the concrete or of the mortar constitutes a risk to the safety of the operator who performs the spraying of the concrete or mortar; in addition, as the rebound is not reemployed, it increases the total quantity of starting materials that is required and lengthens the spraying time needed to obtain a determined thickness of the concrete or mortar layer.

In processes for spraying concrete by a wet route a mix is formed first of all including cement, granulates (sand in the case of a mortar, coarser granulates such as gravel and/or pebbles, and generally sand, in the case of concrete), water (called slaking water) and optionally additives (slaked mix); such a mix can thus be prepared on the actual site or can be delivered there ready for use, especially from a concrete mixing plant; this mix is next generally conveyed by means of a pump (for example a screw pump or a plunger pump), in a pipe, towards a spraying nozzle; a setting accelerator, especially in liquid form, is generally added upstream or at the spraying nozzle; the mixture obtained is sprayed from the spraying nozzle with the aid of compressed air (spraying air or propelling air) onto the support or the surface to be concreted.

In general, when compared with the processes for spraying by a dry route, these processes have a number of advantages: the cement is usually well wetted and the final concrete or mortar is more homogeneous; dust formation decreases.

However, these wet-route processes have some disadvantages; thus, the density of the concrete or of the mortar is reduced as a result of the presence of excess water in the initial concrete or mortar mix, which is not consumed during the hydration, resulting in a reduction in the thickness of a layer sprayed in one run; while the addition of soluble glass to the initial concrete or mortar mix can shorten this setting time, on the other hand it is detrimental to the mechanical strength, in the course of time, of the concrete or mortar, once it has been sprayed.

In addition, the setting accelerators usually employed in processes for spraying by a dry route or by a wet route contain highly alkaline chemical components like, especially, alkali metal hydroxides, alkali metal carbonates and alkali metal aluminates which present a safety hazard to people, in particular at high concentrations; not only can they produce severe skin burns in the event of bad handling, but they can also seriously irritate the eyes of the operator who carries out the spraying of the concrete or of the mortar. Finally, these setting accelerators are to some degree of a contaminating nature, in the sense that the rebound, which is not reemployed, has, as a result of their use, a high content of very alkaline species.

The subject of the present invention is especially to propose a new process for spraying concrete or mortar which makes it possible to avoid the abovementioned disadvantages.

To this end the invention proposes a spraying process making use of a specific additive.

In particular, the invention resides in a process for spraying concrete or mortar, in which a new aqueous suspension (or slurry) is employed containing, especially, a silica, preferably a precipitated silica, a suspension which tends to form a gel when it is left at rest, which avoids the sedimentation or settling of the product during storage, thus ensuring the stability of the suspension over several weeks or even several months, a suspension which retains its homogeneity over such a period; the gel formed is additionally completely reversible under low stress; thus, under low shear or agitation it is converted into a homogeneous suspension of low viscosity and therefore easily pumpable, in particular using the spraying devices which are conventionally employed.

Thus, the subject of the present invention is a process for spraying concrete or mortar by a dry route or, preferably by a wet route, in order to apply to a surface a layer of concrete or mortar, characterized in that just before or at the means of spraying there is added an aqueous suspension (A) which has a pH lower than 4 and a solids content of between 10 and 50% by weight and which is, after a period at rest of 48 hours, in the form of a gel, the said gel being reversible under low shear.

According to an embodiment of the invention the process is performed by a dry route.

In general, a dry mix of concrete or mortar is therefore formed, the said mix is moved in order to introduce it into a means of spraying, the slaking water and the aqueous suspension (A) are added to the said mix, separately or in a combined way, just before or at the means for spraying, and the resulting mixture is sprayed from the means of spraying onto the surface (or the support).

The aqueous suspension (A) and the slaking water can be introduced into the dry mix separately, that is to say by two different means (for example with the aid of two different pumps). They can also be introduced into the mix in a combined way, that is to say by the same means; they are then, in particular, mixed with each other before being introduced into the said mix. The use of the aqueous suspension (A) reduces the rebound and the formation of dust.

It should be noted that the aqueous suspension (A) can be employed, particularly, as slaking water.

Although the spraying process can be carried out by a dry route as described above, its use by a wet route yields particularly outstanding results.

Thus, according to a preferred embodiment of the invention, the process is performed by a wet route.

In general, a slaked concrete or mortar mix is therefore formed, the said mix is moved in order to introduce it into a means of spraying, the aqueous suspension (A) is added to the said slaked mix just before or at the means of spraying and the resulting mixture is sprayed from the means of spraying onto the surface (or the support).

In both embodiments of the invention the means employed for forming the dry mix or the slaked mix, for moving and then introducing this mix into the means for spraying and for spraying the mix on to the surface to be concreted from the said means correspond to those usually employed in the field of spraying concrete or mortar and are therefore well known to a person skilled in the art.

Thus, the dry mix and the slaked mix are generally both formed by blending the materials forming part of their composition; the order of introduction of the said materials into the mixer is immaterial; for example, in the case of the process for spraying by a wet route the granulates or aggregates (sand in the case of a mortar; granulates or coarser aggregates such as gravel and/or pebbles and generally sand, in the case of a concrete) and the cement are first of all blended with each other, water being subsequently introduced, the wet mix thus formed being finally blended.

Additives, such as, for example, a wetting agent, may be optionally incorporated at any suitable time during the preparation of the dry mix (dry-route process) or of the slaked mix (wet-route process). Wetting agents that may be mentioned are especially melamine, sodium polynaphthalenesulphonate, sodium polyacrylate and sodium polycarboxylate.

It is also possible to add reinforcing fibers of polyvinylic alcohol, polypropylene, polyacrylonitrile, cellulose, carbon, kevlar®, polyamide, polyethylene, . . . .

In addition, in the case of the process for spraying by a dry route, the mix which is formed dry is introduced into the means of spraying generally after having been conveyed with the aid of a stream of compressed air in a pipe (or conduit); in the case of the wet-route process the slaked mix is introduced into the means of spraying generally after having been conveyed with the aid of a suitable pump, for example a plunger pump or a screw pump, in a pipe (or conduit).

The aqueous suspension (A) can be delivered just before or at the means of spraying, for example by a metering pump.

The means of spraying usually consists of a spraying nozzle; the combination made up of the dry mix, the slaking water and the aqueous suspension (A) or the combination made up of the slaked mix and of the aqueous suspension (A) is then sprayed from this spraying nozzle, generally with the aid of propelling air which is fed to the said nozzle, the propelling air being usually compressed air.

The use of an aqueous suspension (A) and the place of its introduction into the mix are essential characteristics of the invention.

The aqueous suspension (A) and processes for its preparation will now be described.

The aqueous suspension (A) is an aqueous suspension of silica and of aluminium compound chosen from aluminium sulphate, basic aluminium sulphates, alums and their mixtures, which has a pH lower than 4 and a solids content of between 10 and 50% by weight, and which, after having been left at rest for 48 hours, is in the form of a gel, the said gel being reversible under low shear.

The solids content of the aqueous suspension (A) is between 10 and 50% by weight, preferably between 15 and 45% by weight. It is, for example, between 20 and 40% by weight.

The aqueous suspension (A) has a pH (measured according to ISO standard 787/9 (pH of a 5% suspension in water)) lower than 4, preferably lower than 3.5 and, for example, lower than 3. In addition, this pH is generally at least 2, in particular at least 2.2.

The said suspension advantageously has a silica content (expressed as anhydrous silica) of between 1 and 49% by weight, preferably between 3 and 35% by weight. This content may be between 5 and 30% by weight, in particular between 8 and 20% by weight.

It has advantageously an aluminium compound content (expressed as anhydrous aluminium compound) of between 1 and 49% by weight, preferably between 3 and 40% by weight. This content may be between 5 and 35% by weight, in particular between 10 and 30% by weight.

According to an alternative form of the invention the aqueous suspension (A) has a silica content (expressed as anhydrous silica) of between 11 and 20% by weight and/or an aluminium compound content (expressed as anhydrous aluminium compound) of between 21 and 30% by weight.

The aluminium compound present in the aqueous suspension (A) is chosen from aluminium sulphate, alums and their mixtures.

Alums are intended to mean compounds of aluminium sulphate with alkali metal sulphates, of general formula $MAl(SO_4)_2 \cdot 12H_2O$ (with M=Li, Na or K, for example). The ammonium radical or monovalent thallium can also form alums with aluminium sulphate.

The aluminium compound is very advantageously an aluminium sulphate.

The said aluminium sulphate may originate from an anhydrous aluminium sulphate $(Al_2(SO_4)_3)$ or from a hydrated aluminium sulphate (especially of formula $Al_2(SO_4)_3 \cdot 14H_2O$ or $Al_2(SO_4)_3 \cdot 18H_2O$).

It may be a basic aluminium sulphate chosen, for example, from those of formula:

with:

n a positive integer,

A equal to 1,

B between 0.75 and 2,

C between 0.5 and 1.12,

E is between 1.5 and 4 when the sulphate is solid and E is greater than 4 when the sulphate is in the form of an aqueous solution, and B+2C=3. These may be, for example, the basic aluminium sulphates described in U.S. Pat. No. 4,877,597.

It may also be a basic aluminium sulphate chosen, for example, from those of formula:

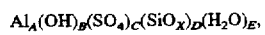

with:

A equal to 1,

B between 0.75 and 2,

C between 0.3 and 1.12,

D between 0.005 and 0.1,

2<X≦4

E is between 1.5 and 4 when the sulphate is solid and E is greater than 4 when the sulphate is in the form of an aqueous solution, and 3=B+2C+2D(X−2). These may be, for example, the basic aluminium sulphates described in U.S. Pat. No. 4,981, 675.

While the silica present in the aqueous suspension (A) may be chosen especially from silica smokes, precipitated silicas, silica compounds including predominantly silica which are chosen from silicoaluminates, for example Tixosil 28 marketed by Rhône-Poulenc, smectites or smectite-type magnesium silicates and their mixtures, at least one precipitated silica is preferably employed as silica.

Precipitated silica is here intended to mean a silica obtained by precipitation from the reaction of an alkali metal silicate with an acid, generally inorganic, at a suitable pH of the precipitation medium, in particular a basic, neutral or weakly acidic pH; the silica may be prepared by any method (addition of acid to a base stock of silicate, total or partial simultaneous addition of acid or of silicate to a base stock of water or of silicate solution, and the like) and the method is chosen as a function of the silica type which it is desired to obtain; at the end of the precipitation stage a stage of separation of the silica from the reaction mixture is generally undertaken by any known means, for example filter press or vacuum filter; a filter cake is thus collected, which is washed if necessary; this cake, optionally after disintegrating, may be dried by any known means, especially by atomizing, and then optionally ground and/or agglomerated.

In the description which follows, the BET specific surface is determined according to the Brunauer-Emmett-Teller method, described in the "Journal of the American Chemical Society", Vol. 60, page 309, February 1938 and corresponding to NFT standard 45007 (November 1987).

The CTAB specific surface is the outer surface determined according to NFT standard 45007 (November 1987) (5.12).

Finally, it is specified that the pore volumes given are measured by mercury porosimetry, the pore diameters being calculated using the Washburn relationship with an angle of contact theta equal to 130° and a surface tension gamma equal to 484 dynes/cm (Micromeritics 9300 porosimeter).

The preferred dispersibility and disintegratability of the silicas that can be employed in the aqueous suspensions (A) can be quantified by means of a specific disintegration test.

The disintegration test is carried out according to the following procedure:

the cohesion of the agglomerates is assessed by a particle size measurement (using laser scattering), performed on a suspension of silica disintegrated beforehand by the application of ultrasonics; the disintegratability of the silica (rupture of the objects from 0.1 to a few tens of microns) is thus measured. The disintegration with ultrasound is performed with the aid of a Vibracell Bioblock (600 W) sonic transducer equipped with a probe 19 mm in diameter. The particle size measurement is performed using laser scattering, in a Sympatec particle size analyser.

2 grams of silica are weighed into a sample tube (height: 6 mm and diameter: 4 cm) and are made up to 50 grams by addition of demineralized water; an aqueous suspension containing 4% of silica is thus produced, which is homogenized for 2 minutes by magnetic stirring. The disintegration with ultrasound is then performed as follows: with the probe immersed over a depth of 4 cm, the output power is adjusted so as to obtain a power dial needle deflection indicating 20% (which corresponds to an energy of 120 watts/cm$^2$ dissipated by the end of the probe). The disintegration is performed for 420 seconds. The particle size measurement is then carried out after a known volume (expressed in ml) of the homogenized suspension has been introduced into the cell of the particle size analyser.

The value of the median diameter $\phi_{50}$ which is obtained is proportionately smaller the greater the disintegratability exhibited by the silica. The ratio (10×volume of suspension introduced (in ml))/optical density of the suspension detected by the particle size analyser is also determined (this optical density is of the order of 20). This ratio indicates the fines content, that is to say the content of particles smaller than 0.1 μm which are not detected by the particle size analyser. This ratio, called an ultrasonic disintegration factor ($F_D$) is proportionately higher the greater the disintegratability exhibited by the silica.

The precipitated silica preferably present in the aqueous suspension (A) generally exhibits a CTAB specific surface of between 50 and 250 m$^2$/g, in particular between 100 and 240 m$^2$/g.

The aqueous suspension (A) advantageously contains a precipitated silica which has a very good dispersibility and disintegratability.

It is thus possible to employ a precipitated silica as described in European Patent Application EP 0520862. In particular, this precipitated silica ($S_1$) may be preferably in the form of substantially spherical beads which have a BET specific surface of between 140 and 200 m$^2$/g, a CTAB specific surface of between 140 and 200 m$^2$/g, a pore distribution such that the pore volume consisting of the pores whose diameter is between 175 and 275 Å represents at least 50%, for example at least 60%, of the pore volume consisting of the pores of diameters smaller than or equal to 400 Å (and, preferably, a mean size of at least 80 μm, for example of at least 100 μm). These beads may have an ultrasonic disintegration factor ($F_D$) higher than 5.5 ml and a median diameter ($\phi_{50}$), after disintegration with ultrasound, smaller than 5 μm.

A precipitated silica which is generally in the form of powder, of granules or of substantially spherical beads and is chosen from the following, may also be employed as silica which has an excellent dispersibility and disintegratability:

a precipitated silica ($S_2$) possessing:
  a CTAB specific surface of between 140 and 240 m$^2$/g,
  an ultrasonic disintegration factor ($F_D$) higher than 11 ml, for example higher than 12.5 ml,
  a median diameter ($\phi_{50}$), after disintegration with ultrasound, smaller than 2.5 μm, in particular smaller than 2.4 μm, for example smaller than 2.0 μm;

a precipitated silica ($S_3$) possessing:
  a CTAB specific surface of between 140 and 240 m$^2$/g,
  a pore distribution such that the pore volume consisting of the pores whose diameter is between 175 and 275 Å represents less than 50%, for example less than 40%, of the pore volume consisting of pores of diameters smaller than or equal to 400 Å,
  an ultrasonic disintegration factor ($F_D$) higher than 5.5 ml,
  a median diameter ($\phi_{50}$), after disintegration with ultrasound, smaller than 5 μm;

a precipitated silica ($S_4$) possessing:
  a CTAB specific surface of between 100 and 140 m$^2$/g,
  a median diameter ($\phi_{50}$), after disintegration with ultrasound, smaller than 2.8 μm, in particular smaller than 2.7 μm, for example smaller than 2.5 μm, in general, an ultrasonic disintegration factor ($F_D$) higher than 3.0 ml;

a precipitated silica ($S_5$) possessing:
- a CTAB specific surface of between 100 and 140 m²/g,
- a pore distribution such that the pore volume consisting of the pores whose diameter is between 175 and 275 Å represents less than 55%, in particular less than 50%, for example less than 40%, of the pore volume consisting of pores of diameters smaller than or equal to 400 Å,
- a median diameter ($\phi_{50}$), after disintegration with ultrasound, which is smaller than 4.5 μm, in particular smaller than 4 μm, for example smaller than 3.8 μm, in general, an ultrasonic disintegration factor ($F_D$) higher than 3.0 ml.

The silica, in particular the precipitated silica, present in the aqueous suspension (A) is in general finely divided, especially as a result of grinding (for example wet grinding) or of disintegration with ultrasound.

Nevertheless, the use of the aluminium compound, in particular of aluminium sulphate, makes it also possible to stabilize suspensions of silica which is not finely divided and which has, on the contrary, a large particle size, in particular such that $d_{10}$ is between 4 and 10 μm, $d_{50}$ is between 15 and 30 μm and $d_{90}$ is between 50 and 100 μm. The quantity $d_{10}$ denotes the particle diameter such that 10% of the population of the silica particles have a smaller diameter; similarly, $d_{50}$ (or $d_{90}$) denotes the particle diameter such that 50% (or 90%) of the population of the silica particles have a smaller diameter. These particle size measurements are preferably performed by laser scattering on a Cilas particle size analyser. It should be noted that, without use of the aluminium compound additive, such silica suspensions settle after less than one week's storage and result in the formation of a deposit which cannot be easily redispersed, in particular under mechanical agitation.

An essential characteristic of the aqueous suspension (A) is its ability to form a gel after it has been left at rest; this prevents the phenomena of sedimentation or settling during storage, thus ensuring the stability of the suspension over a number of weeks or even a number of months (especially at least three months); the suspension substantially retains its homogeneity over such a period. Thus, after a period at rest of 48 hours, preferably already after a period at rest of 24 hours, or even after a period at rest of only 2 hours, the aqueous suspension (A) is in the form of a gel, this gel being reversible under low shear.

Thus, after a period at rest of 24 hours, the aqueous suspension (A) is preferably in the form of a gel which has a viscosity ($V_1$), measured under a shear of 1 s⁻¹ for 1 minute, higher than 0.6 Pa s, preferably higher than 1.5 Pa s, in particular higher than 2.0 Pa s (and in general lower than 25 Pa s).

The procedure for making explicit the gel nature of the aqueous suspension (A) after a period at rest is the following.

The gel is introduced into an MS 125 or MS 145 measurement cell of a Contraves Rheomat Z115 rheometer; shearing at 500 s⁻¹ is performed for 1 minute (agitation at 500 rev/min) in order to destructure the gel; the gel is then allowed to reform for 24 hours, care being taken to cover the cell with a leakproof plastic film in order to prevent possible dehydration of the gel; at the end of these 24 hours the following operations can be carried out:

a viscosity measurement ($V_1$) is performed by applying a shear of 1 s⁻¹ for 1 minute; the measured value is proportionately higher the greater the tendency of the suspension to gel;

another viscosity measurement ($V_2$) can be performed next by applying a shear of 50 s⁻¹ for 1 minute; the measured value is proportionately lower the more fragile the gel; in general, the aqueous suspensions (A) have a viscosity $V_2$ of between 0.05 and 0.4 Pa s;

finally, another viscosity measurement ($V_3$) can be performed by applying a shear of 500 s⁻¹ for 1 minute; the measured value is proportionately lower the greater the pumpability of the suspension; in general, the aqueous suspensions (A) have a viscosity $V_3$ of between 0.03 and 0.35 Pa s.

The gel in the form of which the aqueous suspension (A) according to the invention is after a period at rest of 48 hours (preferably already after a period at rest of 24 hours or even after a period at rest of only 2 hours) is reversible under low stress: under low shear it is thus converted into a homogeneous suspension of low viscosity, and therefore easily pumpable; more particularly, the said gel is such that shearing at 500 s⁻¹ for 1 minute converts it into a suspension which has a viscosity ($V_r$), measured under a shear of 50 s⁻¹ for 1 minute, of at most 0.35 Pa s, preferably at most 0.30 Pa s, for example at most 0.25 Pa s.

The procedure for determining this viscosity ($V_r$) is the following:

The gel is introduced into an MS 125 or MS 145 measurement cell of a Contraves Rheomat Z115; shearing at 500 s⁻¹ is performed for 1 minute in order to destructure the gel; a viscosity measurement ($V_r$) of the product obtained is then performed by applying a shear of 50 s⁻¹ for 1 minute.

It should be noted that the characteristics and properties of the aqueous suspensions (A) are obtained without the use of surface-active agents, regardless of whether they are anionic, cationic, amphoteric or nonionic. Thus, preferably but not necessarily, the aqueous suspensions (A) do not contain any surface-active agents.

The aqueous suspension (A) can be prepared optionally by a process including the mixing, with agitation (especially by mechanical agitation) of an aqueous solution of the aluminium compound, in particular of aluminium sulphate or alum, with a precipitated silica as described above, which is in the form of powder, of granules or of substantially spherical beads, preferably a precipitated silica $S_1$ to $S_5$.

The aqueous suspension (A) can also be prepared by a process including the mixing, with agitation, of an aqueous suspension (B) of silica with the said aluminium compound, in powder form and, optionally of water. Any kind of aqueous silica suspension may be employed, such as an aqueous suspension of precipitated silica, a colloidal silica suspension commonly called a silica sol, it being possible for the latter to be obtained, for example, by filtration of sodium silicate on an ion exchange resin or an aqueous suspension of a silica compound including predominantly silica, as defined above.

In particular, this process includes the addition, with mechanical agitation, of aluminium sulphate, for example anhydrous or preferably hydrated, in powder form and, optionally, of water, to an aqueous suspension (B) of precipitated silica, and then continuation of the agitation of the mixture thus obtained.

Finally, the aqueous suspension (A) can be prepared by a process including the mixing, with agitation, of an aqueous silica suspension (B) and, optionally, of water, with a solution of the said aluminium compound, the latter solution being at a temperature of between 15 and 130° C. In particular, this process includes the mixing, with mechanical agitation, of an aqueous suspension (B) of precipitated silica and, optionally, of water, with a solution of aluminium sulphate (anhydrous or preferably hydrated) which is at a temperature of between 15 and 30° C. or, preferably, between 95 and 130° C. (especially of aluminium sulphate hydrate which is melted in its water of crystallization at this temperature), in particular between 100 and 120° C.

In the processes of preparation making use of an aqueous silica suspension (B), the latter may be optionally obtained by suspending in water, with agitation (especially mechanical agitation), a silica in solid form, in particular a precipitated silica $S_1$ to $S_5$.

After this stage of suspending in water, the suspension can be disintegrated mechanically. The mechanical disintegration (or deflocculation) may be performed in a disintegrator/blender. In general a chemical disintegration is carried out conjointly with this mechanical disintegration by introducing into the disintegrator/blender the sodium aluminate and, preferably and in general simultaneously, an acid (especially an inorganic acid such as sulphuric acid), so that the pH of the suspension (B) remains between 6 and 7 and the $Al/SiO_2$ weight ratio is between 1000 and 3300 ppm. Once this addition has been carried out the mechanical disintegration may optionally be continued.

After the disintegration stage or the stage of suspending in water (if the disintegration stage is not used), a wet grinding or a disintegration with ultrasound of the suspension obtained may be performed.

The wet grinding may be carried out by passing the suspension through a mill of the colloid mill type or a bead mill.

The disintegration with ultrasound may be performed by subjecting the suspension to ultrasonic waves (ultrasound treatment) by means of a high-power ultrasonic probe.

Nevertheless, the aqueous suspension (A) is very preferably prepared by a process using an aqueous suspension (B) of precipitated silica which has been obtained by mechanical disintegration (especially in a disintegrator/blender) of a filter cake originating from a silica precipitation reaction in which reaction, in particular, a silicate of an alkali metal M is reacted with an acidifying agent.

The choice of the acidifying agent and of the silicate is made in a manner which is well known per se.

The acidifying agent generally employed is a strong inorganic acid such as sulphuric acid, nitric acid or hydrochloric acid, or an organic acid such as acetic acid, formic acid or carbonic acid.

The acidifying agent may be dilute or concentrated; its normality may be between 0.4 and 36N, for example between 0.6 and 1.5N.

In particular, in the case where this acidifying agent is sulphuric acid, its concentration is preferably between 40 and 180 g/l, for example between 60 and 130 g/l.

Furthermore, any common form of silicates may be employed as silicate, such as metasilicates, disilicates and advantageously an alkali metal M silicate in which M is sodium or potassium.

The alkali metal M silicate usually has a concentration (expressed as $SiO_2$) of between 40 and 330 g/l, for example between 60 and 300 g/l, in particular between 60 and 250 g/l.

In general, sulphuric acid is employed as acidifying agent and sodium silicate as silicate.

In the case where sodium silicate is employed, the latter generally exhibits an $SiO_2/Na_2O$ weight ratio of between 2 and 4, more particularly between 3.0 and 3.7.

According to a first advantageous embodiment, the filter cake is obtained by a process including:

(A) a reaction of silica precipitation by the action of an alkali metal M silicate with an acidifying agent, in the case of which:
  (i) an initial base stock is formed comprising at least a proportion of the total quantity of the alkali metal M silicate introduced into the reaction and an electrolyte, the silicate concentration (expressed as $SiO_2$) in the said initial base stock being lower than 100 g/l and the electrolyte concentration in the said initial base stock being lower than 17 g/l,
  (ii) the acidifying agent is added to the said base stock until a pH value of the reaction mixture of at least approximately 7 is obtained,
  (iii) acidifying agent is added to the reaction mixture, if appropriate simultaneously with the quantity of alkali metal M silicate,
(B) the filtration of the reaction mixture, so as to recover a filter cake which has a solids content of between 8 and 40% by weight.

A low silicate and electrolyte concentration in the initial base stock are important conditions in this case.

In this embodiment the operation is carried out as follows.

A base stock which includes silicate and an electrolyte is formed first of all. The quantity of silicate present in the base stock may be either equal to the total quantity introduced into the reaction or may represent only a proportion of this total quantity.

Insofar as the electrolyte is concerned, this term is here intended to be understood in its normal accepted sense, that is to say that it means any ionic or molecular substance which, when dissolved, decomposes or dissociates to form ions or charged particles.

In particular, a salt from the group of the salts of alkali and alkaline-earth metals is employed and preferably the salt of the metal M of the starting silicate and of the acidifying agent, for example sodium sulphate in the case of the reaction of a sodium silicate with sulphuric acid.

According to an essential characteristic of this embodiment the electrolyte concentration in the initial base stock is (higher than 0 g/l and) lower than 17 g/l, preferably lower than 14 g/l.

According to another essential characteristic of the said embodiment the silicate concentration in the initial base stock is (higher than 0 g of $SiO_2$ per litre and) lower than 100 g of $SiO_2$ per litre. This concentration is preferably lower than 80 g/l, especially lower than 70 g/l.

The second stage consists in adding the acidifying agent to the base stock of composition described above.

This addition, which entails a related drop in the pH of the reaction mixture is carried out until a value of at least approximately 7, generally of between 7 and 8, is reached.

Once this value is reached, and in the case of a starting base stock including only a proportion of the total quantity of the silicate introduced, a simultaneous addition of acidifying agent and of the remaining quantity of silicate is then advantageously carried out.

The actual precipitation reaction is finished when all the remaining quantity of silicate has been added.

At the end of the precipitation and especially after the precipitated simultaneous addition it is advantageous to perform an aging of the reaction mixture, it being possible for this aging to last, for example, from 5 minutes to 1 hour.

Finally, in all cases (that is to say both in the case of a starting base stock including only a proportion of the total quantity of the silicate introduced and in the case of a starting base stock including the total quantity of silicate introduced), it is possible to add an additional quantity of acidifying agent to the reaction mixture after the precipitation, in an optional subsequent stage. This addition is generally performed until a pH value of between 3 and 6.5, preferably between 4 and 6.5, is obtained.

The temperature of the reaction mixture is generally between 70 and 98° C.

According to an alternative form, the reaction is performed at a constant temperature of between 80 and 95° C. According to another alternative form the temperature at the end of reaction is higher than the temperature at the beginning of reaction; thus, the temperature at the beginning of the reaction is preferably maintained between 70 and 95° C.; the temperature is then increased over a few minutes preferably up to a value of between 80 to 98° C., at which it is maintained until the end of the reaction.

A reaction mixture consisting of a silica slurry is obtained at the end of the operations just described.

Stage (B) of this first advantageous embodiment then consists in filtering this silica slurry so as to recover a filter cake which has a solids content of between 8 and 40% by weight.

The filtration may be carried out by any suitable method, for example using a belt filter, a vacuum rotary filter or, preferably, using a filter press.

The cakes obtained by press filtration generally have fairly high solids contents.

It should be noted that the precipitated silica $S_1$ mentioned above in the description can be prepared by spray-drying the filter cake obtained (in particular when using a filter press), preferably by means of a multinozzle sprayer, it being additionally necessary for this cake to have, immediately before its drying, a solids content of at most 24% by weight (preferably at most 23% by weight) and higher than 18% by weight (preferably higher than 20% by weight), it being possible for the said cake to have been mechanically and, optionally, chemically disintegrated before the drying, as indicated elsewhere.

According to a second advantageous embodiment, the filter cake is obtained by a process including:

(A) a reaction of silica precipitation by the action of an alkali metal M silicate with an acidifying agent, in the case of which:
  (i) an initial base stock is formed comprising a proportion of the total quantity of the alkali metal M silicate introduced into the reaction, the silicate concentration (expressed as $SiO_2$) in the said base stock being lower than 20 g/l,
  (ii) the acidifying agent is added to the said initial base stock until at least 5% of the quantity of $M_2O$ present in the said initial base stock is neutralized,
  (iii) acidifying agent and the remaining quantity of alkali metal M silicate are simultaneously added to the reaction mixture such that the ratio of added quantity of silicate (expressed as $SiO_2$)/quantity of silicate present in the initial base stock (expressed as $SiO_2$), called consolidation ratio, is higher than 4 and at most 100, (B) the filtration of the reaction mixture, so as to recover a filter cake which has a solids content of between 8 and 40% by weight.

A very low silicate concentration in the initial base stock and an appropriate consolidation ratio during the simultaneous addition stage are important conditions in this case.

In this embodiment the operation is carried out as follows.

A base stock which includes silicate is formed first of all. The quantity of silicate present in this initial base stock advantageously represents only a proportion of the total quantity of silicate introduced into the reaction.

According to an essential characteristic of this embodiment the silicate concentration in the initial base stock is (higher than 0 g of $SiO_2$ per litre and) lower than 20 g of $SiO_2$ per litre.

This concentration may be at most 11 g/l and, optionally, at most 8 g/l.

This concentration may be at least 8 g/l, in particular between 10 and 15 g/l, especially when the filtration performed subsequently is carried out by means of a filter press.

The initial base stock may include an electrolyte. Nevertheless, preferably, no electrolyte is employed in the course of this embodiment; in particular, the initial base stock preferably does not include any electrolyte.

The second stage consists in adding the acidifying agent to the base stock of composition described above.

Thus, in this second stage, the acidifying agent is added to the said initial base stock until at least 5%, preferably at least 50%, of the quantity of $M_2O$ present in the said initial base stock is neutralized.

In this second stage the acidifying agent is preferably added to the said initial base stock until 50 to 99% of the quantity of $M_2O$ present in the said initial base stock is neutralized.

Once the desired value of quantity of neutralized $M_2O$ is reached, a simultaneous addition (stage (iii)) of acidifying agent and of a quantity of alkali metal M silicate is then undertaken, such that the consolidation ratio, that is to say the ratio of added quantity of silicate (expressed as $SiO_2$)/ quantity of silicate present in the initial base stock (expressed as $SiO_2$) is higher than 4 and at most 100.

According to an alternative form this simultaneous addition of acidifying agent and of a quantity of alkali metal M silicate is undertaken, such that the consolidation ratio is more particularly between 12 and 100, preferably between 12 and 50, especially between 13 and 40.

According to another alternative form this simultaneous addition of acidifying agent and of a quantity of alkali metal M silicate is undertaken, such that the consolidation ratio is rather higher than 4 and lower than 12, preferably between 5 and 11.5, especially between 7.5 and 11. This alternative form is generally used when the silicate concentration in the initial base stock is at least 8 g/l, in particular between 10 and 15 g/l, for example between 11 and 15 g/l.

Throughout stage (iii) the added quantity of acidifying agent is preferably such that 80 to 99%, for example 85 to 97%, of the added quantity of $M_2O$ is neutralized.

In stage (iii) it is possible to undertake the simultaneous addition of acidifying agent and silicate at a first pH plateau of the reaction mixture, $pH_1$, and then at a second pH plateau of the reaction mixture, $pH_2$, such that $7<pH_2<pH_1<9$.

The actual precipitation reaction is finished when all the remaining quantity of silicate has been added.

It may be advantageous, especially after the abovementioned simultaneous addition, to perform an aging of the reaction mixture, it being possible for this aging to last, for example, from 1 to 60 minutes, in particular from 5 to 30 minutes.

Finally, it is desirable to add an additional quantity of acidifying agent to the reaction mixture after the precipitation, in a subsequent stage, especially before the optional aging. This addition is generally performed until a pH value of the reaction mixture of between 3 and 6.5, preferably between 4 and 5.5, is obtained. It allows, in particular, the whole quantity of $M_2O$ added during stage (iii) to be neutralized.

The acidifying agent during this addition is generally identical with that employed during stage (iii).

The temperature of the reaction mixture is usually between 60 and 98° C.

The addition of acidifying agent during stage (ii) is preferably performed in an initial base stock whose temperature is between 60 and 96° C.

According to an alternative form, the reaction is performed at a constant temperature of between 75 and 96° C. According to another alternative form the temperature at the end of reaction is higher than the temperature at the beginning of reaction: thus, the temperature at the beginning of the reaction is preferably maintained between 70 and 96° C. and the temperature is then increased during the reaction over a few minutes, preferably up to a value of between 80 and 98° C., at which value it is maintained until the end of the reaction.

A reaction mixture consisting of a silica slurry is obtained at the end of the operations just described.

Stage (B) of this second advantageous embodiment then consists in filtering this silica slurry so as to recover a filter cake which has a solids content of between 8 and 40% by weight.

While the filtration may be carried out by any suitable method (for example using a filter press, belt filter or vacuum rotary filter), it is advantageously performed using a filter press, for example when the silicate concentration in the initial base stock is at least 8 g/l (and lower than 20 g/l), in particular between 10 and 15 g/l, especially between 11 and 15 g/l.

The cakes obtained by press filtration generally have fairly high solids contents.

It should be noted that the precipitated silicas $S_2$ to $S_5$ mentioned above in the description can be prepared by spray-drying, preferably by means of a multinozzle sprayer (in general if it is desired to obtain them in the form of substantially spherical beads) or by means of a multiturbine sprayer (in general if it is desired to obtain them in powder form), the cake which is obtained (in general by press filtration, if it is desired to obtain them as substantially spherical beads, or by vacuum rotary filtration, if it is desired to obtain them in powder form); before the drying, this cake may have been disintegrated mechanically and, optionally, chemically, as indicated elsewhere.

When the cake to be dried has a solids content higher than 15% by weight the drying is preferably carried out by means of a multinozzle sprayer; when this content is at most 15% by weight the drying is preferably carried out by means of a multiturbine sprayer.

The precipitated silicas $S_2$ to $S_5$ can be obtained in the form of granules by subjecting the dried product (in particular starting with a cake which has a solids content of at most 15% by weight) to an agglomeration operation (especially direct compression, wet route granulation, extrusion or, preferably, dry compacting).

The aqueous suspensions (A) which are produced by the two advantageous embodiments described above generally exhibit the best properties, in particular in the concrete or mortar spraying application.

If necessary, the filter cake may be washed with water, especially in these two advantageous embodiments, in particular to remove the alkali metal M salts formed during the precipitation reaction. For example, in the case where the precipitation involves sodium silicate and sulphuric acid, a cake which has an $Na_2SO_4$ content lower than 1.5% by weight can be isolated at the end of stage (B).

It should be noted that it is possible, optionally, to perform a thickening of the filter cake to increase its solids content to the desired value of between 8 and 40% by weight. The thickening consists in adding silica in solid form (pulverulent silica) in sufficient quantity to the said cake; in particular, this silica may be obtained by drying, especially by spray-drying, a proportion of the cake to be enriched. Pulverulent silica can also be obtained by performing a conventional drying of the cake after washing with organic solvents.

The aqueous suspension (A) is therefore preferably prepared by a process using an aqueous suspension (B) of precipitated silica, this suspension (B) having been obtained by mechanical disintegration of a silica filter cake, advantageously of a filter cake obtained in accordance with either of the embodiments described above.

A chemical disintegration may be carried out conjointly with this mechanical disintegration by introducing, for example into a disintegrator/blender, sodium aluminate and, preferably and in general simultaneously, an acid (especially an inorganic acid such as sulphuric acid), so that the pH of the suspension (B) remains between 6 and 7 and the $Al/SiO_2$ weight ratio is between 1000 and 3300 ppm. The mechanical disintegration may optionally be continued once this addition has been carried out.

After the disintegration stage a wet grinding or a disintegration with ultrasound of the suspension obtained may be performed.

The wet grinding and the ultrasonic disintegration may be carried out as indicated above in the description.

The suspension may be subjected to mechanical agitation before the disintegration with ultrasound.

The aqueous suspension (B) of precipitated silica especially when prepared from a filter cake obtained in accordance with either of the advantageous embodiments described above and after the said wet grinding or the said disintegration with ultrasound, is, for example, such that its solids content is between 10 and 40% by weight, its viscosity, measured under a shear of 50 s$^{-1}$ for 1 minute, is lower than 0.04 Pa s, and in particular lower than 0.02 Pa s, and the quantity of silica present in the supernatant obtained after centrifuging the said suspension at 7500 rev/min for 3 minutes represents more than 50%, in particular more than 60%, especially more than 70% or even more than 90%, of the weight of the silica present in the suspension (a quantity measured after drying the supernatant at 160° C. until a constant weight of material is obtained).

Finally, another aqueous suspension (B) of precipitated silica which can be employed in the processes for the preparation of the aqueous suspension (A) and exhibiting the characteristics just mentioned above can, optionally, be obtained by a process of conversion of the filter cake synthesized in either of the advantageous embodiments of the invention which are described above, a process by means of which:

(a) the said cake is washed with an organic solvent and the cake thus washed is dried to obtain a silica in pulverulent form, (b) a quantity of the said silica in pulverulent form is suspended in water, such that the solids content of the aqueous suspension (B) of precipitated silica which is obtained is between 10 and 40% by weight.

Washing with organic solvents enables the water present in the pores of the cake to be displaced. The solvents used for this purpose are preferably polar solvents, especially ethanol and ether, which may be employed as a mixture.

In particular, it is possible to perform:

a first washing with ethanol, a second washing with a 50/50 ethanol/ether mixture, a third washing with ether.

Thus washed, the cake may be dried, for example in the ambient air. A free water content is obtained which is quite comparable with that obtained by spray-drying.

This type of drying can make it possible to prevent the collapse of porosity due to the action of capillarity forces during the drying.

A silica is thus obtained (in pulverulent form) which is very slightly agglomerated, with a porosity (measured by mercury porosimetry) which is very much higher than that obtained by the spray-drying techniques.

When it is resuspended in water in a quantity such that the solids content of the suspension is between 10 and 40% by weight, this silica generally produces aqueous suspensions of precipitated silica which are less viscous than those obtained by resuspending a silica obtained conventionally by spray-drying.

The presentation of the aqueous suspension (A) in gel form, when it is left at rest, makes it possible to dispense with the problems of sedimentation or settling of the product, thus ensuring stability over several weeks or several months (3 months, for example); the gel formed is reversible under low shear: it is "broken" under low stress and is then converted into a homogeneous suspension of low viscosity which is easily pumpable, in particular using the spraying devices usually employed. The use of this additive in the process for spraying according to the invention does not therefore require any specific device but may, on the contrary, be carried out with the aid of conventional apparatus, resulting in the absence of additional cost to the user.

Other advantages of the process according to the invention, especially of the wet-route spraying process, are set out below.

The process according to the invention applies to any type of surface or support. It finds a particularly advantageous application in the field of the construction of tunnels, as well as of excavation enclosures such as Berlin walls, supporting walls and excavation stabilization.

The use of an aqueous suspension (A) as described above makes it no longer necessary to employ setting accelerators, accelerators that are generally very alkaline in nature. Nevertheless, it does not constitute a departure from the invention if a setting accelerator (for example in liquid form) is employed; the latter can then be introduced just before or at the means of spraying, for example with the aid of a metering pump (generally other than that which may be employed for the aqueous suspension (A)); such an accelerator is then generally employed only in a fairly small quantity.

The hygiene and safety conditions, especially in the case of the operator making use of the spraying process according to the invention, are improved as a result of the very weakly irritant nature of the aqueous suspension (A), in particular when the latter contains aluminium sulphate as the aluminium compound.

The use of an aqueous suspension (A) in the process according to the invention additionally allows a very appreciable decrease in the losses on spraying due to rebound (and therefore better safety in the case of the operator performing the spraying of the concrete or of the mortar) and the production of very thick layers of sprayed concrete or mortar; the use of the process according to the invention thus permits an appreciable gain in output efficiency.

In fact, obtaining a rebound lower than 5% is possible, and the thickness of the sprayed wall can reach at least 30 to 60 cm on the vertical walls and at least 15 to 20 cm on the vault.

This reduction in the losses on spraying due to rebound and this increase in the sprayed layer illustrate an improvement in the adhesiveness ("adhesive" appearance) of the concrete or of the mortar which is sprayed.

Another subject-matter of the invention is the use, as additive for concrete or mortar to be sprayed, of the aqueous suspension (A) as described above, especially for increasing the thickness of the sprayed layer and reducing the rebound.

In addition, the use of the aqueous suspension (A) in the process according to the invention, even generally when no setting accelerator is additionally employed, does not deteriorate the long-term mechanical properties of the sprayed concrete or mortar; on the contrary, it is found that it results in high compressive strength values at 28 days. Generally, we obtain 80% of the compressive strength of a non accelerated concrete and values of at least 45 MPa for a concrete such as the CEM I 52.5 (measurements performed on concrete cores).

Obtaining these good long-term mechanical properties, in combination with the properties described above, can make it possible particularly to supply a so-called structural sprayed concrete for the production of the supporting ring in tunnels, it being possible for the structure obtained thus to form an advantageous and less costly alternative to the conventional structures produced in segments or by casting concrete.

The above advantages are preferably obtained when a quantity of aqueous suspension (A) is employed such that the quantity by weight of silica which is employed (expressed as anhydrous silica) is between 0.5 and 5%, in particular between 0.5 and 2.5%, in relation to the weight of cement and/or the quantity by weight of aluminium compound, for example of aluminium sulphate which is employed (expressed as anhydrous aluminium compound) is between 0.2 and 8%, in particular between 0.2 and 3%, in relation to the weight of cement.

In the case where the quantity of aluminium compound which is employed, especially of aluminium sulphate (expressed as anhydrous product) is higher than 0.5%, preferably between 1.5 and 6%, in particular between 2 and 4% (for example between 2 and 3%) relative to the weight of cement, a rapid hardening of the sprayed coat is preferably observed, making it possible to work in complete safety, for example under the vault, as soon as a few hours after the spraying; high initial compressive strength values are thus obtained, for example of at least 2 to 4 MPa at 3 hours, at a temperature higher than or equal to 10° C. (application to the production of so-called structural concrete or mortar, especially for the production of the supporting ring in tunnels).

In the case where the quantity of aluminium compound which is employed, especially of aluminium sulphate (expressed as anhydrous product) is at most 0.5%, for example between 0.2 and 0.45%, relative to the weight of cement, the thixotropic and formable nature of the sprayed composition is maintained for more than 0.5 hours (preferably for 2 hours) after the spraying (application to the production of concrete and mortar that can be float-finished).

The kinetics of setting of the sprayed concrete or mortar can thus be modulated, especially as a function of the quantity of aluminium compound which is employed.

The water/cement (W/C) weight ratio of the composition leaving the means of spraying is in general between 0.45 and 0.60, preferably between 0.47 and 0.54 (the water of hydration of the granulates is included in W).

The invention is limited not at all to one particular type of cement; any type of cement conventionally employed in processes for spraying concrete or mortar, for example a cement of the Portland type, may thus be used.

The following examples illustrate the invention without, however, limiting its scope.

EXAMPLE 1

A precipitated silica cake C1 is prepared as follows.

The following are introduced into a stainless-steel reactor fitted with a stirring system using propellers and with heating by means of a jacket:

346 liters of water 7.5 kg of $Na_2SO_4$ (electrolyte)

587 liters of aqueous sodium silicates exhibiting an $SiO_2/Na_2O$ weight ratio equal to 3.50 and a relative density at 20° C. of 1.133.

The silicate concentration (expressed as $SiO_2$) in the base stock is then 85 g/l. The mixture is heated to 79° C. while stirring is continued. 386 liters of dilute sulphuric acid with a relative density at 20° C. of 1.050 are then introduced into the mixture until a pH value equal to 8 (measured at the temperature of the mixture) is obtained. The temperature of the reaction mixture is 79° C. during the first 25 minutes and is then raised from 79° C. to 86° C. over 15 min, and then maintained at 86° C. until the end of the reaction.

Once the pH value equal to 8 is reached, 82 liters of aqueous sodium silicate with an $SiO_2/Na_2O$ weight ratio equal to 3.50 and a relative density at 20° C. equal to 1.133 and 131 liters of acid of the type described above are introduced together into the reaction mixture, this simultaneous introduction of acid and silicate being carried out so that the pH of the reaction mixture is continuously equal to 8±0.1. After all the silicate has been introduced the introduction of dilute acid is continued for 9 min so as to bring the pH of the reaction mixture to a value of 5.2. The introduction of acid is then stopped and the reaction slurry is kept stirred for an additional 5 min.

The total reaction period is 118 min.

A slurry of precipitated silica is obtained which is filtered and washed by means of a filter press so that finally a silica cake C1 is recovered whose loss on ignition is 78% (and hence a solids content of 22% by weight) and whose $Na_2SO_4$ content is 1% by weight.

EXAMPLE 2

4 kg of cake C1 prepared in Example 1 (obtained by press filtration and exhibiting a solids content of 22% by weight and an $Na_2SO_4$ content of 1% by weight), heated beforehand to 60° C., are introduced into a Cellier disintegrator blender.

13.1 ml of a sodium aluminate solution (which has an $Al_2O_3$ content of 22% by weight and an $Na_2O$ content of 18% by weight (relative density: 1.505)) and 7.47 ml of a solution of sulphuric acid at a concentration of 80 g/l (relative density: 1.505) are then introduced simultaneously during the deflocculation of the cake, so as to maintain the pH at a value of 6.5.

The Al/$SiO_2$ weight ratio is approximately 2600 ppm.

Aging is allowed to take place for 20 minutes while the mechanical deflocculation is continued.

The silica suspension C2 which is obtained is characterized by:

a viscosity of 0.06 Pa s (measured under a shear of 50 s$^{-1}$ for 1 minute);

a particle size such that $d_{10}$=5 µm, $d_{50}$=19 µm, $d_{90}$=60 µm.

At the end of one week's storage the following are observed:

the formation, at the bottom of the storage container, of a deposit which is excessively difficult, or even impossible, to redisperse;

an increase in the viscosity of the suspension: its viscosity is then 0.45 Pa s (measured under a shear of 50 s$^{-1}$ for 1 minute).

EXAMPLE 3

1 kg of the suspension C2 prepared in Example 2 (sampled after the disintegration) exhibiting a solids content of 22% by weight, is placed in a receptacle fitted with a Rayneri single-bladed mechanical stirrer.

220 grams of aluminium sulphate hydrate $Al_2(SO_4)_3 \cdot 14H_2O$ in powder form are added to it over 3 minutes with mechanical stirring (speed of rotation of the blade: 500 rev/min).

The stirring is continued for about fifteen minutes.

A homogeneous suspension C3 is obtained, exhibiting the following characteristics:

| | |
|---|---|
| pH | 3.25 |
| solids content (% by weight) | 28.4 |
| silica content (% by weight) (calculated as anhydrous silica) | 18.0 |
| aluminium sulphate content (% by weight) (calculated as anhydrous aluminium sulphate) | 10.4 |

In addition, after 2 hours at rest, the said suspension sets solid and is therefore in the form of a gel.

After one week's storage the gel is converted, by shearing at 500 s$^{-1}$ for 1 minute, into a homogeneous suspension exhibiting a viscosity ($V_r$), measured under a shear of 50 s$^{-1}$ for 1 minute, of 0.25 Pa s.

When left at rest, this suspension is converted back into gel after 2 hours.

After one month's storage this gel is converted, under gentle stirring (500 s$^{-1}$ for 1 minute) into a suspension exhibiting substantially the same characteristics as that obtained by "breaking" the gel after one week's storage.

EXAMPLE 4

The chamber of a Netzch LME1 mill is fed with 2 liters of suspension C2 prepared in Example 2 (sampled after the disintegration), exhibiting a solids content of 22% by weight, at a rate of 0.083 liters/min; the filling ratio of the chamber with alumina beads (diameter: 0.6–1 mm) is 75% and the rate of rotation of the shaft is 2000 rev/min.

At the end of this wet grinding stage a suspension C4 is obtained, characterized by:

a viscosity of 0.016 Pa s (measured under a shear of 50 s$^{-1}$ for 1 minute);

a particle size such that $d_{10}$=1.13 µm, $d_{50}$=2.1 µm, $d_{90}$=5.4 µm;

a solids content of 22% by weight.

EXAMPLE 5

1 kg of the suspension C4 prepared in Example 4, exhibiting a solids content of 22% by weight, is placed in a receptacle fitted with a Rayneri single-bladed mechanical stirrer.

440 grams of aluminium sulphate hydrate $Al_2(SO_4)_3 \cdot 14H_2O$ in powder form are added to it over 3 minutes with mechanical stirring (speed of rotation of the blade: 500 rev/min).

The stirring is continued for about fifteen minutes.

A homogeneous suspension C5 is obtained, exhibiting the following characteristics:

| | |
|---|---|
| pH | 3.05 |
| solids content (% by weight) | 32.9 |
| silica content (% by weight) (calculated as anhydrous silica) | 15.3 |
| aluminium sulphate content (% by weight) (calculated as anhydrous aluminium sulphate) | 17.6 |

In addition, after 24 hours at rest, the said suspension sets solid and is therefore in the form of a gel.

This gel exhibits viscosities $V_1$, $V_2$ and $V_3$ (which are measured according to the procedure shown in the description) equal to 7.27 Pa s, 0.20 Pa s and 0.075 Pa s respectively.

After one week's storage the gel is converted, by shearing at 500 s$^{-1}$ for 1 minute, into a homogeneous suspension exhibiting a viscosity ($V_r$), measured under a shear of 50 s$^{-1}$ for 1 minute, of 0.11 Pa s.

When left at rest, this suspension is converted back into gel after 24 hours.

After one month's storage this gel is converted, under gentle stirring (500 s$^{-1}$ for 1 minute) into a suspension exhibiting substantially the same characteristics as that obtained by "breaking" the gel after one week's storage.

EXAMPLE 6

1 kg of the suspension C4 prepared in Example 4, exhibiting a solids content of 22% by weight, is placed in a receptacle fitted with a Rayneri single-bladed mechanical stirrer.

100 grams of water and 880 grams of aluminium sulphate hydrate $Al_2(SO_4)_3.14H_2O$ in powder form are added to it over 3 minutes with mechanical stirring (speed of rotation of the blade: 500 rev/min).

The stirring is continued for about fifteen minutes.

A homogeneous suspension C6 is obtained, exhibiting the following characteristics:

| | |
|---|---|
| pH | 2.6 |
| solids content (% by weight) | 36.7 |
| silica content (% by weight) (calculated as anhydrous silica) | 11.1 |
| aluminium sulphate content (% by weight) (calculated as anhydrous aluminium sulphate) | 25.6 |

In addition, after 24 hours at rest the said suspension sets solid and is therefore in the form of a gel.

This gel exhibits viscosities $V_1$, $V_2$ and $V_3$ (which are measured according to the procedure shown in the description) equal to 2.5 Pa s, 0.12 Pa s and 0.10 Pa s respectively.

After one week's storage the gel is converted, by shearing at 500 s$^{-1}$ for 1 minute, into a homogeneous suspension exhibiting a viscosity ($V_r$), measured under a shear of 50 s$^{-1}$ for 1 minute, of 0.11 Pa s.

When left at rest, this suspension is converted back into gel after 24 hours.

After one month's storage this gel is converted, under gentle stirring (500 s$^{-1}$ for 1 minute) into a suspension exhibiting substantially the same characteristics as that obtained by "breaking" the gel after one week's storage.

EXAMPLE 7

1 kg of the suspension C2 prepared in Example 2 (sampled after the disintegration), exhibiting a solids content of 22% by weight, and 100 grams of water are added to 880 grams of aluminium sulphate hydrate $Al_2(SO_4)_3.14H_2O$ melted at 110° C. in its water of crystallization.

The addition is performed over about fifteen minutes.

A homogeneous suspension C7 is obtained, exhibiting the following characteristics:

| | |
|---|---|
| pH | 2.6 |
| solids content (% by weight) | 36.7 |
| silica content (% by weight) (calculated as anhydrous silica) | 11.1 |
| aluminium sulphate content (% by weight) (calculated as anhydrous aluminium sulphate) | 25.6 |

In addition, after 24 hours at rest, the said suspension sets solid and is therefore in the form of a gel.

This gel exhibits viscosities $V_1$, $V_2$ and $V_3$ (which are measured according to the procedure shown in the description) equal to 1.8 Pa s, 0.23 Pa s and 0.17 Pa s respectively.

After one week's storage the gel is converted, by shearing at 500 s$^{-1}$ for 1 minute, into a homogeneous suspension exhibiting a viscosity ($V_r$), measured under a shear of 50 s$^{-1}$ for 1 minute, of 0.17 Pa s.

When left at rest, this suspension is converted back into gel after 24 hours.

After one month's storage this gel is converted, under gentle stirring (500 s$^{-1}$ for 1 minute) into a suspension exhibiting substantially the same characteristics as that obtained by "breaking" the gel after one week's storage.

EXAMPLE 8

1 kg of the suspension C2 prepared in Example 2 (sampled after the disintegration), exhibiting a solids content of 22% by weight, and 240 grams of water are added to 1020 grams of aluminium sulphate hydrate $Al_2(SO_4)_3.14H_2O$ melted at 110° C. in its water of crystallization.

The addition is performed over about fifteen minutes.

A homogeneous suspension C8 is obtained, exhibiting the following characteristics:

| | |
|---|---|
| pH | 2.4 |
| solids content (% by weight) | 35.8 |
| silica content (% by weight) (calculated as anhydrous silica) | 9.8 |
| aluminium sulphate content (% by weight) (calculated as anhydrous aluminium sulphate) | 26.0 |

In addition, after 24 hours at rest, the said suspension sets solid and is therefore in the form of a gel.

This gel exhibits viscosities $V_1$, $V_2$ and $V_3$ (which are measured according to the procedure shown in the description) equal to 1.0 Pa s, 0.12 Pa s and 0.09 Pa s respectively.

After one week's storage the gel is converted, by shearing at 500 s$^{-1}$ for 1 minute, into a homogeneous suspension exhibiting a viscosity ($V_r$), measured under a shear of 50 s$^{-1}$ for 1 minute, of 0.09 Pa s.

When left at rest, this suspension is converted back into gel after 24 hours.

After one month's storage this gel is converted, under gentle stirring (500 s$^{-1}$ for 1 minute) into a suspension exhibiting substantially the same characteristics as that obtained by "breaking" the gel after one week's storage.

EXAMPLE 9

A slaked concrete mix is prepared in a concrete production station by mixing the constituents below according to the following process:

introduction into a mixer of 1015 kg/m³ of 0/4 mm sand, 175 kg/m³ of 4/8 mm gravel and 785 kg/m³ of 8/16 mm granulates;

addition of 425 kg/m³ of high-strength Portland cement (corresponding to European Standard CEM I 52.5);

homogenizing (by blending) the dry mix obtained for 120 seconds;

addition of a quantity of water such that the W/C ratio of the mix obtained lies between 0.43 and 0.50;

addition of 4.25 kg/m³ of wetting agent (marketed by Sika under the name of Sikatard 902);

homogenizing (by blending) the wet mix obtained for 120 seconds.

The slaked concrete mix is conveyed from the concrete mixing plant to the site in a mixer truck.

It is then introduced into a Schwing spraying machine on the site; a plunger pump next conveys the mixture, in a pipe, towards a spraying nozzle. This spraying nozzle is fed with compressed air (propelling air).

An aqueous suspension C3, C5, C6, C7 or C8 is introduced into the slaked mix at the spraying nozzle.

The flow rate of the aqueous suspension is linked to the flow rate of the slaked mix, so as to obtain weight ratios of (anhydrous) silica/cement ($R_1$) and (anhydrous) aluminium sulphate/cement ($R_2$) which are mentioned in the table below, which also shows the mechanical strength values obtained at 3 hours (CS (3 h)) and at 28 days (CS (28 d)).

| SUSPENSION | R1 (%) | R2 (%) | W/C (at spraying) | CS (3h) (MPa) | CS (28d) (MPa) |
|---|---|---|---|---|---|
| C3 | 1.0 | 0.5 | 0.490 | 0.7 | 50.0 |
| C5 | 1.8 | 2.1 | 0.516 | 2.0 | 50.0 |
| C6 | 1.0 | 2.6 | 0.500 | 4.0 | 47.0 |
| C7 | 1.0 | 2.3 | 0.500 | 3.0 | 45.0 |
| C8 | 1.0 | 2.7 | 0.500 | 5.0 | 45.0 |

High compressive strength values are thus obtained at 28 days.

In addition, in the case of suspensions C5, C6, C7 and C8, high initial compressive strength values (at least 2 MPa at 3 hours) are obtained; in the case of suspension C3, it is found that the sprayed concrete is capable of being float-finished sooner.

Finally, in the case of all the spraying performed, the following are found:

a high adhesiveness of the concrete to the wall, which is reflected in a rebound lower than 5%;

a sprayed layer thickness of 40 cm on vertical wall and 15 cm on vault.

We claim:

1. A process for spraying a layer of concrete or mortar on a surface, the process comprising steps of:

forming a concrete or mortar mixture by adding an additive to the concrete or mortar prior to or during spraying of the concrete or mortar, the additive comprising an aqueous suspension A of silica and of aluminum compound chosen from aluminum sulphate, alkaline aluminum sulphates, alums and their mixtures, the aqueous suspension A having a pH lower than 4 and a solids content of between 10 and 50% by weight, and, after a period at rest of 48 hours, the aqueous suspension A being in the form of a gel which is reversible under shear; and spraying the concrete or mortar mixture onto a surface.

2. The process according to claim 1, wherein the spraying process is performed by a dry route wherein dry concrete or mortar mix is used.

3. The process according to claim 2, wherein the spraying process comprises delivering a dry concrete or mortar mix to a spraying apparatus, adding slaking water and the aqueous suspension A to the mix and spraying the mix including the slaking water and aqueous suspension A onto the surface.

4. The process according to claim 3, wherein the mix is formed dry from cement and granulates.

5. The process according to claim 3, wherein the aqueous suspension A and the slaking water are mixed with each other before addition of the aqueous suspension A and the slaking water to the mix.

6. The process according to claim 3, wherein the slaking water consists of the aqueous suspension A.

7. The process according to claim 1, wherein the spraying process is performed by a wet route.

8. The process according to claim 7, wherein the spraying process comprises delivering a slaked concrete or mortar mix to a spraying apparatus, adding the aqueous suspension A to the slaked mix and spraying the slaked mix and aqueous suspension A onto the surface.

9. The process according to claim 8, wherein the slaked mix is formed from cement, granulates and water.

10. The process according to claim 1, wherein the spraying is performed without adding a setting accelerator to the concrete or mortar.

11. The process according to claim 1, wherein the concrete or mortar contains a wetting agent.

12. The process according to claim 1, wherein the aqueous suspension A has a pH lower than 3.5.

13. The process according to claim 1, wherein the aqueous suspension A has a silica content, expressed as anhydrous silica, of between 1 and 49% by weight.

14. The process according to claim 13, wherein the silica content is between 3 and 35% by weight.

15. The process according to claim 1, wherein the aqueous suspension A has an aluminum compound content, expressed as anhydrous aluminum compound, of between 1 and 49% by weight.

16. The process according to claim 15, wherein the aluminum compound content is between 3 and 40% by weight.

17. The process according to claim 1, wherein the aluminum compound is aluminum sulphate.

18. The process according to claim 1, wherein the silica is chosen from silica smoke, precipitated silicas and their mixtures.

19. The process according to claim 18, characterized in that the silica is precipitated silica.

20. The process according to claim 1, wherein after a period at rest of 24 hours, the aqueous suspension A is in the form of a gel which is reversible under shear.

21. The process according to claim 1, wherein after a period at rest of 2 hours, the aqueous suspension A is in the form of a gel which is reversible under low shear.

22. The process according to claim 1, wherein after a period at rest of 24 hours, the aqueous suspension A is in the form of a gel which has a viscosity $V_1$, measured under a shear of 1 s$^{-1}$ for 1 minute, higher than 0.6 Pa s.

23. The process according to claim 22, wherein the viscosity $V_1$ is higher than 1.5 Pa s.

24. The processing according to claim 1, wherein the gel is such that shearing at 500 $s^{-1}$ for 1 minute converts it into a suspension which has a viscosity $V_1$, measured under a shear of 50 $s^{-1}$ for 1 minute, of at most 0.35 Pa s.

25. The process according to claim 24, wherein the viscosity $V_1$ is at most 0.30 Pa s.

26. The process according claim 1, wherein the silica is in the form of a powder.

27. The process according to claim 1, wherein the aqueous suspension A is prepared by a process including mixing, with agitation, of silica in solid form with an aqueous solution of the aluminum compound.

28. The process according to claim 1, wherein the aqueous suspension A is prepared by a process including mixing, with agitation, of an aqueous suspension B of silica with the aluminum compound in powder form and, optionally, of water.

29. The process according to claim 28, wherein the aqueous silica suspension B has been obtained by suspending in water, with agitation, a silica in solid form.

30. The process according to claim 29, wherein the suspension obtained is disintegrated mechanically after the stage of suspending in water.

31. The process according to claim 29, wherein a chemical disintegration is carried out conjointly with the mechanical disintegration, by introducing sodium aluminate and, optionally, an acid, so that the pH of the suspension B remains between 6 and 7 and the aluminum content in weight % is between 1000 and 3300 ppm.

32. The process according to claim 29, wherein after the stage of suspending in water or the disintegration stage, a wet grinding or a disintegration with ultrasound of the suspension obtained is performed.

33. The process according to claim 1, wherein the aqueous suspension A is prepared by a process including mixing, with agitation, of an aqueous suspension B and, optionally, of water with a solution of the aluminum compound which is at a temperature of between 15 and 130° C.

34. The process according to claim 33, wherein the aqueous suspension A is prepared by a process including mixing, with mechanical agitation, of an aqueous suspension B of precipitated silica and, optionally, of water, with a solution of aluminum sulphate which is at a temperature of between 95 and 130° C.

35. The process according to claim 1, wherein a quantity of aqueous suspension A is employed such that the quantity by weight of silica employed expressed as anhydrous silica is between 0.5 and 5% relative to the weight of cement.

36. The process according to claim 35, wherein the quantity of silica is between 0.5 and 2.5%.

37. The process according to claim 1, wherein a quantity of aqueous suspension A is employed such that the quantity by weight of aluminum compound employed expressed as anhydrous aluminum compound is between 0.2 and 8% relative to the weight of cement.

38. The process according to claim 37, wherein the quantity of aluminum compound is between 0.2 and 3%.

39. The process according to claim 1, wherein the aqueous suspension A is added in an amount which increases thickness of a sprayed layer of the concrete or mortar mixture and reduces rebound of the concrete or mortar mixture applied to the surface during the spraying step.

40. A process for spraying a layer of concrete or mortar on a surface, the process comprising adding an additive to the concrete or mortar prior to or during spraying of the concrete or mortar, the additive comprising an aqueous suspension A of silica and of aluminum compound chosen from aluminum sulphate, basic aluminum sulphates, alums and their mixtures, the aqueous suspension A having a pH lower than 4 and a solids content of between 10 and 50% by weight, and, after a period at rest of 48 hours, being in the form of a gel which is reversible under low shear, the aqueous suspension A being prepared by a process including mixing, with agitation, of an aqueous suspension B of silica with the aluminum compound in powder form and, optionally, of water, the aqueous silica suspension B being an aqueous suspension B of precipitated silica which has been obtained by mechanical disintegration of a filter cake originating from a silica precipitation reaction.

41. The process according to claim 40, wherein the filter cake is obtained by a process including:
  reacting an alkali metal M silicate with an acidifying agent, in the case of which:
    an initial base stock is formed comprising at least a fraction of the total quantity of the alkali metal M silicate introduced into the reaction and an electrolyte, the silicate concentration, expressed as $SiO_2$, in the initial base stock being lower than 100 g/l and the electrolyte concentration in the initial base stock being lower than 17 g/l,
    the acidifying agent is added to the base stock until a pH value of the reaction mixture of at least approximately 7 is obtained,
    the acidifying agent is added to the reaction mixture, optionally simultaneously with the remaining quantity of alkali metal M silicate,
  filtering the reaction mixture, so as to recover a filter cake which has a solids content of between 8 and 40% by weight.

42. The process according to claim 41 wherein the filtration is performed by means of a filter press.

43. The process according to claim 40, wherein the filter cake is obtained by a process including:
  reacting an alkali metal M silicate with an acidifying agent, in the case of which:
    an initial base stock is formed comprising a fraction of the total quantity of the alkali metal M silicate introduced into the reaction, the silicate concentration, expressed as $SiO_2$, in the initial base stock being lower than 20 g/l,
    the acidifying agent is added to the initial base stock until at least 5% of the quantity of $M_2O$ present in the initial base stock is neutralized,
    the acidifying agent and the remaining quantity of alkali metal M silicate are simultaneously added to the reaction mixture such that the ratio of added quantity of silicate, expressed as $SiO_2$/quantity of silicate present in the initial base stock, expressed as $SiO_2$, is higher than 4 and at most 100, filtering the reaction mixture, so as to recover a filter cake which has a solids content of between 8 and 40% by weight.

44. The process according to claim 40, wherein a chemical disintegration is carried out conjointly with the mechanical disintegration by introducing sodium aluminate and, optionally, an acid, so that the pH of the suspension B remains between 6 and 7.

45. The process according to claim 40, wherein after the disintegration stage, a wet grinding or a disintegration with ultrasound of the suspension obtained is performed.

46. The process according to claim 45, wherein after the wet grinding or the disintegration with ultrasound, the aqueous suspension B of precipitated silica is such that its solids content is between 10 and 40% by weight, its viscosity, measured under a shear of 50 s$^{-1}$ for 1 minute, is lower than $4 \times 10^{-2}$ Pa s and the quantity of silica present in the supernatant obtained after centrifuging the suspension at 7500 rev/min for 30 minutes represents more than 50% of the weight of the silica present in the suspension.

* * * * *